(12) United States Patent
Wimmer et al.

(10) Patent No.: US 10,753,273 B2
(45) Date of Patent: Aug. 25, 2020

(54) INTERNAL COMBUSTION ENGINE

(71) Applicant: INNIO Jenbacher GmbH & Co OG, Jenbach (AT)

(72) Inventors: Andreas Wimmer, Graz (AT); Peter Christiner, Graz (AT); Claudia Schubert-Zallinger, Graz (AT); Matthias Grotz, Innsbruck (AT)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 266 days.

(21) Appl. No.: 14/944,638

(22) Filed: Nov. 18, 2015

(65) Prior Publication Data
US 2016/0169085 A1 Jun. 16, 2016

(30) Foreign Application Priority Data

Dec. 15, 2014 (EP) .................................. 14004212

(51) Int. Cl.
*F02B 43/04* (2006.01)
*F02M 21/02* (2006.01)
(Continued)

(52) U.S. Cl.
CPC .......... *F02B 43/04* (2013.01); *F02B 19/1085* (2013.01); *F02M 21/0218* (2013.01);
(Continued)

(58) Field of Classification Search
CPC .. F02B 19/1085; F02B 19/16; F02B 2201/04; F02B 43/04; F02M 21/0218;
(Continued)

(56) References Cited

U.S. PATENT DOCUMENTS

| 4,903,656 A | 2/1990 | Nakazono et al. |
| 5,081,969 A * | 1/1992 | Long, III ............ F02B 19/1028 |
| | | 123/274 |

(Continued)

FOREIGN PATENT DOCUMENTS

| CN | 103261636 A | 8/2013 |
| EP | 0 377 265 | 7/1990 |

(Continued)

OTHER PUBLICATIONS

European Search Report dated Feb. 18, 2015 in corresponding European Application No. 14004212 (with English translation).
(Continued)

*Primary Examiner* — Carl C Staubach
(74) *Attorney, Agent, or Firm* — Fletcher Yoder, P.C.

(57) ABSTRACT

An internal combustion engine, in particular a gas Otto-cycle engine, is provided. The internal combustion engine comprises a plurality of cylinders. Each cylinder is provided with a pre-chamber, and a pre-chamber gas supply conduit through which the pre-chamber can be supplied with fuel gas. The fuel gas is supplied to the pre-chambers by way of a pre-chamber gas valve associated with the respective pre-chamber. Also, an aperture is arranged between the pre-chamber gas supply conduit and the pre-chamber gas valve. At least one aperture associated with a pre-chamber gas valve has a through-flow coefficient such that pressure occurring at a maximum between combustion cycles in a volume between the pre-chamber gas valve and the aperture does not reach a pressure prevailing in the pre-chamber gas supply conduit.

10 Claims, 3 Drawing Sheets

(51) Int. Cl.
  *F02B 19/10* (2006.01)
  *F02M 37/00* (2006.01)
(52) U.S. Cl.
  CPC .... *F02M 21/0239* (2013.01); *F02M 37/0041* (2013.01); *F02B 2201/04* (2013.01); *Y02T 10/125* (2013.01); *Y02T 10/32* (2013.01)
(58) Field of Classification Search
  CPC ............ F02M 21/0239; F02M 37/0041; Y02T 10/125; Y02T 10/32
  See application file for complete search history.

(56) References Cited

U.S. PATENT DOCUMENTS

| | | | | |
|---|---|---|---|---|
| 5,752,486 | A | * | 5/1998 | Nakashima .......... F02M 47/027 123/447 |
| 7,383,861 | B1 | | 6/2008 | Brown |
| 8,757,127 | B2 | * | 6/2014 | Ishida ..................... F01P 3/16 123/254 |
| 8,826,883 | B2 | * | 9/2014 | Ishida ..................... F01P 3/16 123/261 |
| 2007/0283927 | A1 | * | 12/2007 | Fukumoto ............ F02M 31/125 123/445 |
| 2011/0224889 | A1 | | 9/2011 | Imamura et al. |
| 2012/0102736 | A1 | * | 5/2012 | Livshits ................ F02M 43/04 29/888.01 |
| 2012/0310510 | A1 | | 12/2012 | Imamura et al. |
| 2014/0196686 | A1 | * | 7/2014 | Coldren .................. F02B 19/12 123/299 |
| 2015/0028239 | A1 | * | 1/2015 | Terakado ........... F02M 21/0269 251/129.15 |
| 2016/0160742 | A1 | * | 6/2016 | Willi .................. F02B 19/1085 123/260 |
| 2016/0293516 | A1 | * | 10/2016 | Provenziani .............. F28F 3/02 |

FOREIGN PATENT DOCUMENTS

| | | |
|---|---|---|
| EP | 0 780 569 | 6/1997 |
| EP | 2 330 284 | 6/2011 |
| EP | 2 518 299 | 10/2012 |
| EP | 2 787 192 | 10/2014 |
| JP | 2000-320369 | 11/2000 |
| JP | 2005-256654 | 9/2005 |
| JP | 2009-221935 | 10/2009 |
| JP | 2012-132420 | 7/2012 |
| JP | 2013-113256 | 6/2013 |

OTHER PUBLICATIONS

Machine translation and Chines Office Action issued in connection with corresponding CN Application No. 201510921438.8 dated Aug. 30, 2017.

* cited by examiner

INTERNAL COMBUSTION ENGINE

TECHNOLOGY FIELD

This disclosure concerns an internal combustion engine, in particular a gas Otto-cycle engine.

BACKGROUND

Internal combustion engines with pre-chambers are known from the state of the art. In internal combustion engines, as from a given displacement volume, the energy of an ignition spark of a spark plug alone is no longer sufficient to reliably ignite the fuel gas-air mixture which is frequently very lean for emission reasons in the main combustion chamber. Pre-chamber engines therefore have a further combustion chamber which is only a fraction of the volume of the main combustion chamber and in which a fuel gas-air mixture is ignited by an ignition device. That pre-chamber communicates with the main combustion chamber by way of a passage. The ignition flares flash over into the main combustion chamber through the transfer flow bores at the end of the passage, that is at the main combustion chamber, and ignite the mixture which is present in the main combustion chamber.

In a so-called unflushed pre-chamber, during the compression cycle, mixture is urged out of the main combustion chamber into the pre-chamber, and therefore the same gas-air mixture is present in the main combustion chamber and the pre-chamber. If in contrast the pre-chamber is additionally supplied with fuel gas or mixture then reference is made in that case to a flushed pre-chamber. In the case of flushed pre-chambers therefore in order to increase the ignition energy of the pre-chamber the mixture in the pre-chamber is enriched with a small amount of fuel gas or an additional fuel.

EP 0377265 describes for example a gas engine having a pre-chamber which is supplied with fuel gas through a gas conduit 18. A non-return valve 24 opens when the required opening differential pressure is achieved and permits fuel gas to pass to the pre-chamber.

An internal combustion engine of the general kind set forth here has a pre-chamber which can be supplied with fuel gas by a pre-chamber gas supply section. Metering of fuel gas from the pre-chamber gas supply section into the pre-chamber is effected by a pre-chamber gas valve. The pre-chamber gas supply section itself is fed with gas from the gas supply of the internal combustion engine. For setting the desired pre-chamber gas amount the gas feed is generally effected by way of central aperture between the main gas supply and the pre-chamber gas supply section.

The pre-chamber gas valve is generally in the form of a passive non-return valve which opens only at a given positive difference between the pressure of the gas supply and the pressure in the pre-chamber, and thus meters out a given amount of gas to the pre-chamber. If the pressure is below the opening differential pressure the pre-chamber gas valve remains closed.

As the pre-chamber gas supply is frequently coupled to the compressor of the internal combustion engine the pressure in the pre-chamber gas supply generally corresponds to the charge pressure or is linked thereto.

If the compression curve of the main combustion chamber is considered then opening of the pre-chamber gas valve takes place during the charge change, when the opening differential pressure of the pre-chamber gas valve is exceeded.

Due to the abrupt opening of the pre-chamber gas valves when a sufficiently great pressure difference is achieved between the pressure in the pre-chamber gas supply conduit and the main combustion chamber, pressure fluctuations are imposed on the gas volume in the pre-chamber gas conduit. Those pressure fluctuations can influence the desired opening times of the pre-chamber gas valves as well as the supplied amount of gas, including for other cylinders.

More specifically, the pressure fluctuations in the pre-chamber gas supply conduit provide that a different pressure from the nominal pressure of the pre-chamber gas supply occurs locally before a pre-chamber gas valve and therefore that pressure ratio between the pre-chamber gas supply conduit and the main combustion chamber, that causes opening of the pre-chamber gas valve, is attained for an excessively short time, too long or not at all.

The consequence is that an undefined amount of fuel gas is fed to the pre-chambers, this being at indefinite times.

Deviations from the predetermined amount of fuel gas fed to the pre-chamber have negative influences on the emissions, the efficiency and the combustion stability of the internal combustion engine. For example, with an excessively low feed of fuel into the pre-chamber there is the risk that the pre-chamber cannot reliably ignite the main combustion chamber.

In order therefore to moderate the pressure fluctuations which are imposed on the column of gas in the pre-chamber gas supply there are usually provided in that conduit portion communicating the pre-chamber gas supply conduit with the individual pre-chamber gas valves, apertures (therefore additional "decentral" apertures in relation to the "central" aperture between the main gas supply and the pre-chamber gas section), through which the gas can only flow in throttled relationship.

Those local apertures which are known per se from the state of the art provide that the volume between the aperture and the pre-chamber gas valve fills in a slowed-down process. Fluctuations in the pre-chamber gas supply conduit ("rail") are reduced due to that slow "charging". This also provides that the abrupt opening of the pre-chamber gas valve cannot transmit pressure fluctuations to the pre-chamber gas supply, or can transmit only heavily damped pressure fluctuations. That is intended to provide that the same amount of fuel gas is always fed to all pre-chambers which are respectively associated with a combustion chamber of the internal combustion engine.

It is known however that deviations in the variation in cylinder pressure during the charge change and the high-pressure phase occur between the cylinders of an internal combustion engine including a plurality of combustion chambers. That so-called cylinder inequality is already inevitable for the reason that there are geometrical deviations between the piston-cylinder units and flow effects in the charge change. A disadvantage in that respect is that a low pressure in the pre-chamber during the charge change leads to a greater amount of pre-chamber gas supplied, and vice-versa.

Differences in the pre-chamber gas valves and in the cylinder-individual parts of the pre-chamber gas supply also lead to further contributions to cylinder inequality.

SUMMARY OF THE DISCLOSURE

The present disclosure provides an apparatus for the metered supply of pre-chamber gas and a process for the production thereof, by which it is possible to guarantee equality of the cylinders in regard to the metered supply of pre-chamber gas.

The term fuel gas in the context of the present application denotes pure gas (this means a combustible gas, for example natural gas), or a gas-air mixture.

According to the subject disclosure, it is provided that at least one and preferably all of the apertures associated with a pre-chamber gas valve has or have such a small through-flow coefficient that the pressure which occurs at a maximum between the combustion cycles in the volume between the pre-chamber gas valve and the aperture does not reach the pressure prevailing in the pre-chamber gas supply conduit. The through-flow coefficient is a measure in respect of the achievable throughput of fluid through an opening, in this case the aperture, and can be interpreted as an effective cross-section. The smaller the geometrical flow cross-section, the correspondingly lower is also the through-flow coefficient. An additional influencing value on the through-flow coefficient is the configuration of the aperture geometry.

The through-flow coefficient which is so small provides that differences in the amount of pre-chamber gas fed to the various piston-cylinder units are reduced, more specifically correspondingly more, the lower the adopted through-flow coefficient.

More specifically the applicant established in tests that, when adopting an unusually low through-flow coefficient for the apertures which are disposed in the conduit portion between the pre-chamber gas supply conduit and the pre-chamber gas valve, this provides that the pressure level of the pre-chamber gas supply conduit is not reached in the volume between the aperture and the pre-chamber gas valve during a combustion cycle.

Rather, in the volume between the aperture and the pre-chamber gas valve, a maximum pressure occurs, which is related to the amount of pre-chamber gas fed. The amount of pre-chamber gas is on the one hand dependent on the cylinder pressure of the piston-cylinder unit associated with that pre-chamber during the pre-chamber gas valve opening phase. In addition the amount of pre-chamber gas is also dependent on the through-flow characteristic of the cylinder-individual pre-chamber gas supply conduit as far as the pre-chamber and the through-flow characteristic of the pre-chamber gas valve.

In other words, this provides that the pressure level in that volume portion which for the actual metered feed of gas is made available to the pre-chamber, more specifically that volume between the aperture and the pre-chamber gas valve, is partially decoupled from the pressure level obtaining in the pre-chamber gas supply conduit. Equality of the differential pressures acting by way of the valves is achieved.

The deviations or differences in the cylinder-individual pre-chamber gas supply conduits as far as the pre-chamber, as well as deviations or differences in the through-flow characteristic of the pre-chamber gas valves, besides the pressure differences in the piston-cylinder units, also lead to skewing of the pre-chamber gas supply and are alleviated by the arrangement according to the invention.

A condition therefore occurs in which the pre-chambers are substantially equated in respect of the amount of pre-chamber gas. The invention provides a self-regulating system for cylinder equalization while retaining a pre-chamber gas valve which actually operates purely passively. The system can be adapted to cylinder-individual changes in engine operation or engine equipment.

In that respect, it is already sufficient for the pressure value to be minimally below the rail pressure. A noteworthy effect in regard to equalization already occurs if the pressure which occurs as a maximum between the combustion cycles, in the volume between the pre-chamber gas valve and the aperture, remains below 99% of the pressure in the pre-chamber gas supply. Preferably the aperture diameter or the through-flow coefficient of the aperture is so selected that the pressure remains below 95% of the pressure in the pre-chamber gas supply conduit. Particularly preferably the aperture diameter or the through-flow coefficient of the aperture is so selected that the pressure remains below 85% of the pressure in the pre-chamber gas supply conduit.

In a development of the subject disclosure it is provided that at least two apertures have a mutually different through-flow coefficient. In other words, respectively different apertures can be associated with the pre-chambers of the individual piston-cylinder units. That provides that, with the known occurrence of cylinder inequality, that is to say differences in the combustion chamber pressure development in the piston-cylinder units, that can be taken into consideration by way of an individual choice of the aperture.

The invention is described in greater detail hereinafter by means of the specific description.

DETAILED DESCRIPTION

Figure 1:
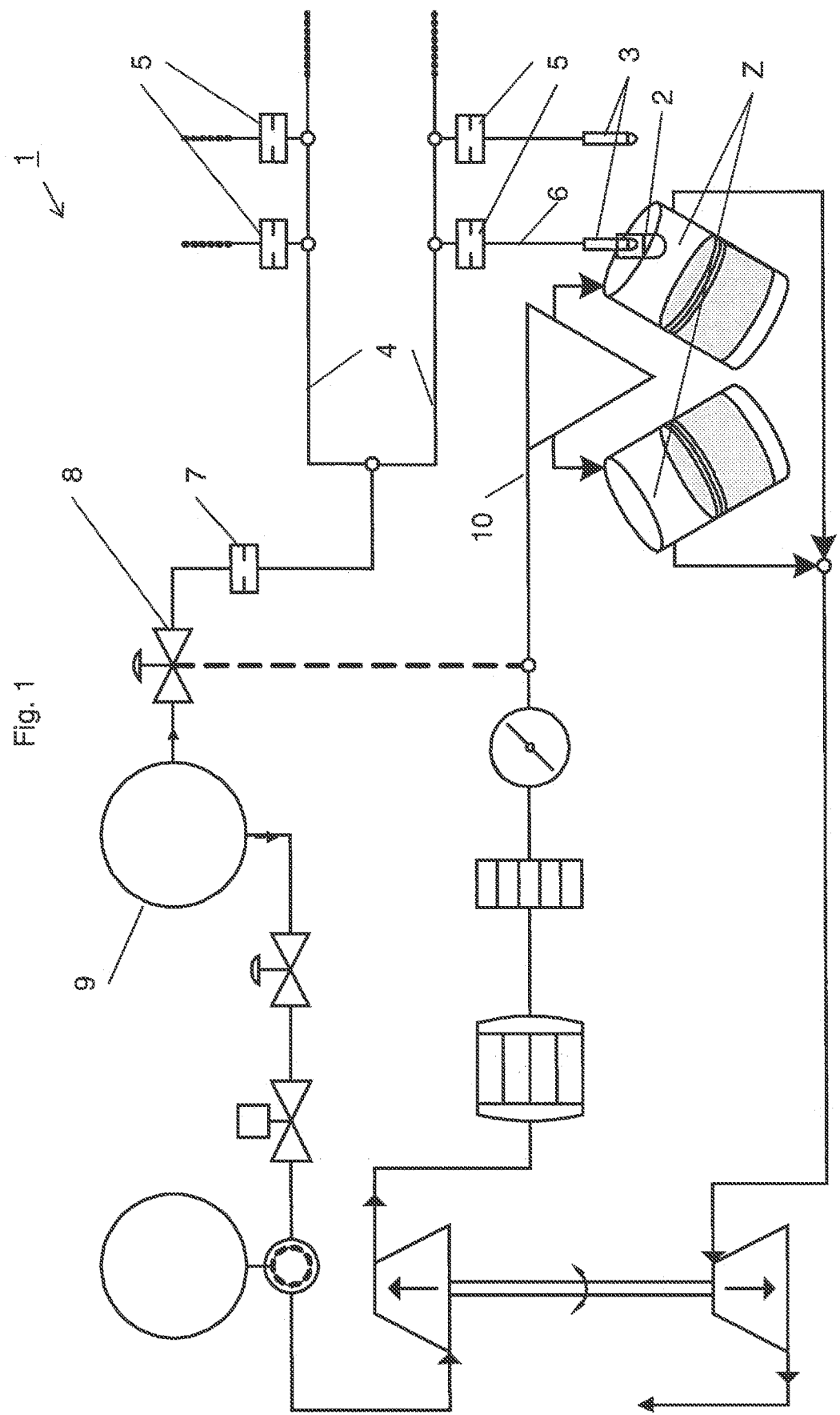
FIG. 1 shows a diagrammatic view of an internal combustion engine with pre-chamber gas supply.

FIG. 1 is a diagrammatic view showing an internal combustion engine 1 having a plurality of cylinders Z. For the sake of clarity only two cylinders Z are shown. The combustion chambers of the cylinder Z receive combustible mixture by way of the induction manifold 10. A configuration which is not shown but which can equally be envisaged is one in which compressed air is fed to the combustion chambers by way of the induction manifold 10 and fuel gas is fed thereto separately by way of dedicated valves, for example port injection valves.

Ignition for the combustion chambers in the cylinders Z is effected by pre-chambers 2 (for the sake of clarity only one pre-chamber 2 is shown), from which ignition flares pass into the combustion chamber of the cylinders Z, as is known per se from the state of the art. For that purpose an ignition device is arranged in the pre-chambers 2 (this is not shown).

Associated with the individual pre-chambers and thus the individual cylinders Z is a respective pre-chamber gas valve 3, by way of which fuel gas can be fed to the pre-chambers from the pre-chamber gas supply conduit 4. For the sake of clarity the association of the pre-chamber 2 and the pre-chamber gas valve 3 is shown only on one cylinder Z.

The pre-chamber gas valves 3 are mostly in the form of passive non-return valves which open at a given positive pressure between the pressure in the conduit 6 and the pressure prevailing in the pre-chamber 2 and thus meteredly feed a given amount of gas to the pre-chamber 2. If the pressure is below the opening differential pressure the pre-chamber gas valve remains closed. The pressure in the pre-chambers approximately corresponds to the combustion chamber pressure of the associated cylinders Z.

The pre-chamber gas supply conduit 4 is fed by a main gas supply 9 by way of a pressure regulating valve 8 and a central aperture 7. The pressure regulating valve 8 regulates the pressure in the pre-chamber gas supply conduit 4 to a constant ratio to the charge pressure of the internal combustion engine. Besides setting the pre-chamber gas volume flow, the central aperture 7 provides that no pressure pulsations are transmitted from the main gas supply 9 to the pre-chamber gas supply conduit 4.

Decentral apertures 5 are associated with the pre-chamber gas supply conduit 4, wherein a respective decentral aperture 5 is arranged in that conduit portion 6 of the pre-chamber gas supply, that leads from the pre-chamber gas supply conduit 4 to the individual pre-chambers 2 of the internal combustion engine 1. This means that a decentral aperture 5 is associated with each pre-chamber valve 3.

Upon opening of the pre-chamber gas valves 3 fuel gas flows out of the conduit portion 6 into the pre-chamber. Fuel gas is delayed by the decentral aperture 5 in its flow out of the pre-chamber gas supply conduit 4 into the conduit portion 6. In the state of the art the decentral apertures 5 are of such dimensions that they throttle pressure fluctuations and that the pressure of the pre-chamber gas supply conduit 4 prevails prior to opening of the pre-chamber gas valve 3 in the conduit portion 6.

In the configuration according to the invention of the decentral apertures 5, the pressure prevailing in the pre-chamber gas supply conduit 4 is not achieved in the conduit portion 6 during a working cycle of the internal combustion engine 1.

Figure 2:
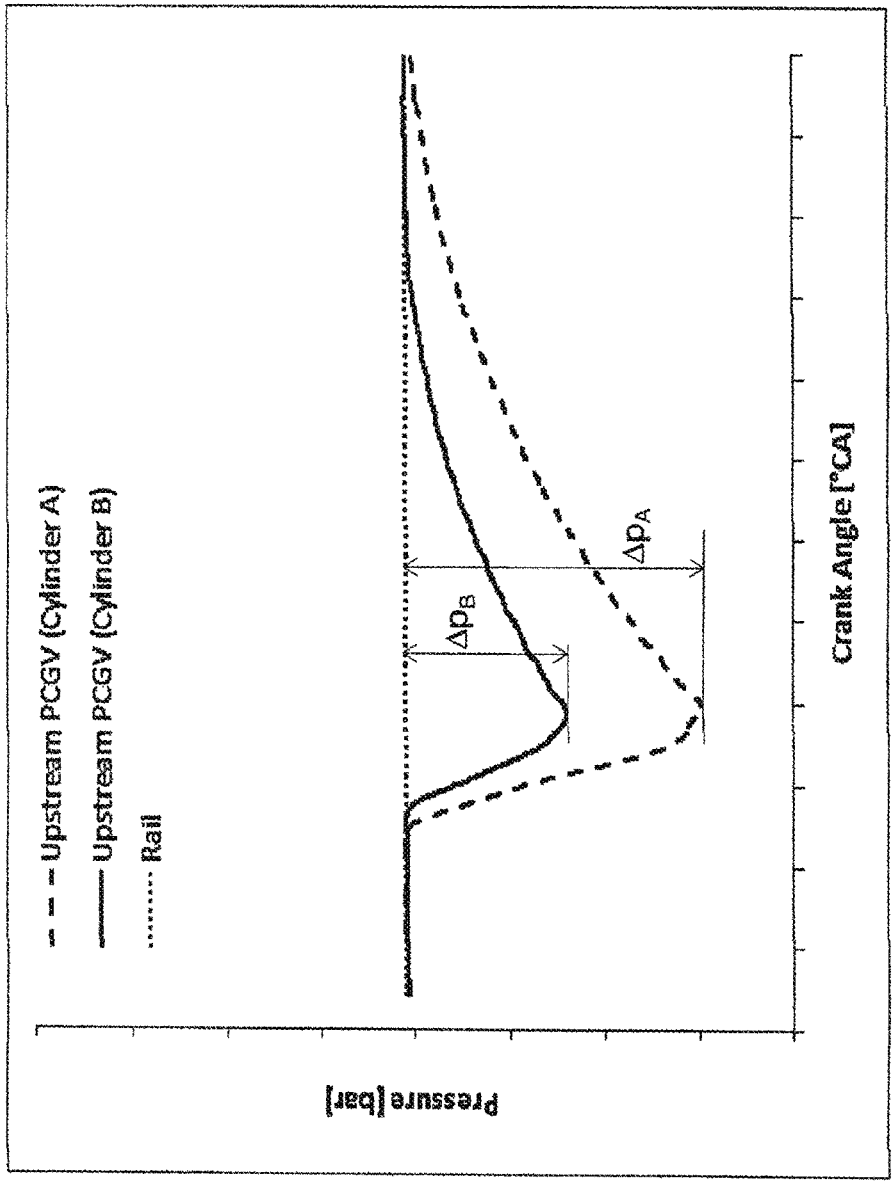
FIG. 2 shows a graph with pressure variations before the pre-chamber gas valve in accordance with the state of the art.

FIG. 2 shows various variations in the pressure in the volume between the decentral aperture 5 and the pre-chamber gas valve 3 during a working cycle (corresponding to 720° in the case of a 4-stroke engine) for a decentral aperture 5 having a diameter or through-flow coefficient in accordance with the state of the art. The Figure shows the pressure variations for cylinder A and cylinder B of an internal combustion engine 1. The pressure in the volume between the pre-chamber gas valve 3 and the aperture 5 is plotted on the ordinate and the crank angle on the abscissa.

Two markedly different cylinders were selected in order to demonstrate the unintended differences in the metered feed of pre-chamber gas for those two cylinders. The pressure variation for cylinder A is shown as a dashed line, that for cylinder B is shown as a solid line, while the pressure in the pre-chamber gas supply conduit 4 ("rail pressure") is shown as a dotted line.

For both cylinders A and B the starting pressure corresponds to the pressure in the pre-chamber gas supply conduit 4. The pre-chamber gas valve 3 opens when a given positive pressure difference is reached between the pressure in the pre-chamber gas supply conduit 4 and the pressure in the pre-chamber 2.

It will be seen that the pressure drop $\Delta p_A$ for the cylinder A is much more heavily pronounced than for the pressure drop $\Delta p_B$ for the cylinder B. On the simplified assumption that the difference between the minimum and the maximum pressure in the volume 6 is proportional to the amount of gas which is flowing across, it can be seen that the cylinder A receives substantially more pre-chamber gas than the cylinder B.

Expressed in other words, in the opening phase of the pre-chamber gas valve 3, the cylinder A, because of the lower pressure in the cylinder, can suck in more gas from the pre-chamber gas supply conduit 4 than the cylinder B.

After closure of the valves the pressures in the volumes 6 for both cylinders A and B regain the starting pressure, that is to say the pressure in the pre-chamber gas supply conduit 4. If the pressure in the pre-chamber gas supply conduit 4 is established as 100% therefore the pressures in the volumes 6 achieve that 100% during a combustion cycle.

Figure 3:
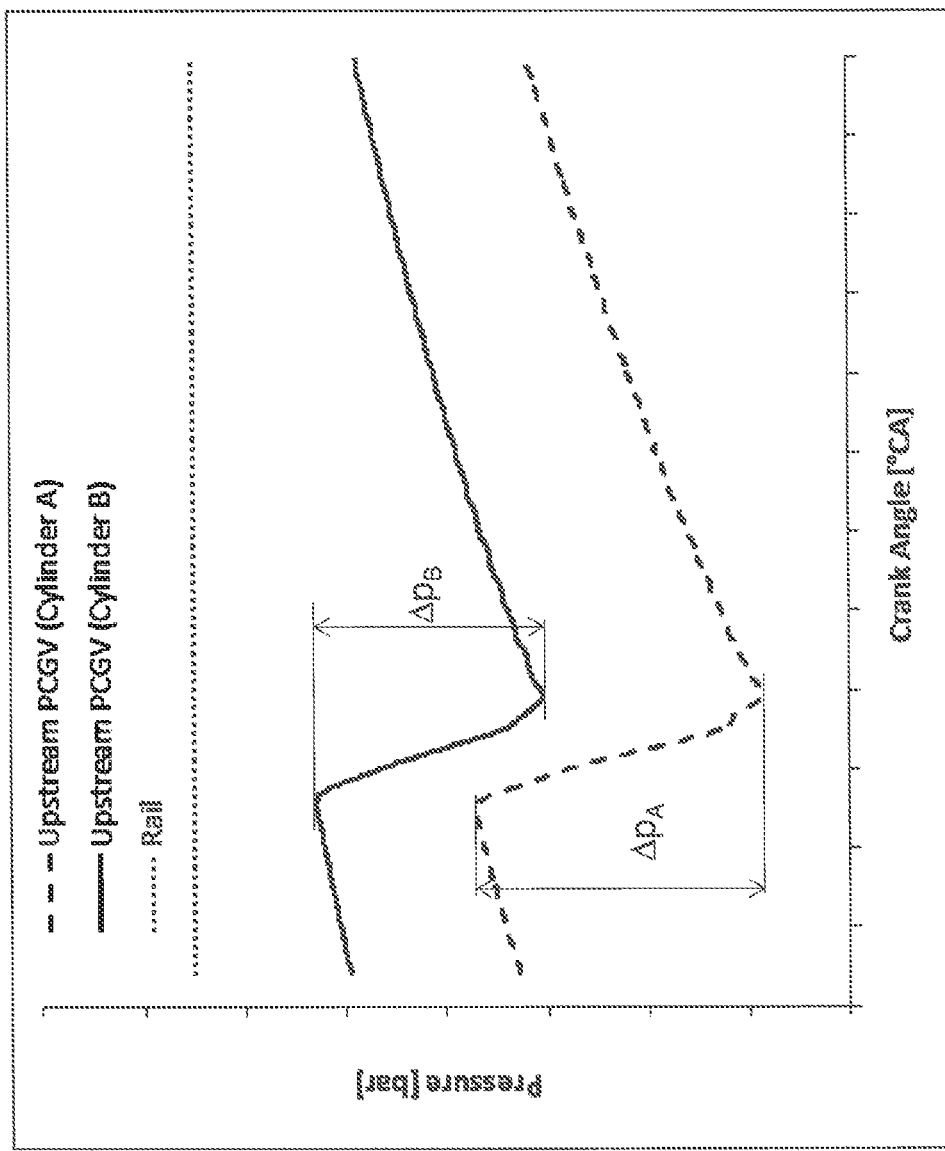
FIG. 3 shows a graph with pressure variations before the pre-chamber gas valve (according to the disclosure).

Reference will now be made to FIG. 3 to discuss the pressure variations described with reference to FIG. 2, for an embodiment in which the through-flow coefficient of the decentral aperture 5 has been reduced to an unusual extent.

The first evident alteration concerns the different pressure levels before opening of the valve. It will be seen that cylinder B, again shown as a solid line, starts at a higher pressure level than the cylinder A, shown as a dashed line.

The two cylinders A and B do not reach the pressure level of the pre-chamber gas supply conduit 4 ("rail", shown as a dotted line). If the pressure in the pre-chamber gas supply conduit 4 is again established at 100% then the pressures in the volumes 6 do not reach the 100% within a cycle.

It can be clearly seen that the pressure variations, $\Delta p_A$ for the cylinder A and $\Delta p_B$ for the cylinder B, which is the maximum difference between the starting value and the lowest value reached, were matched for the two cylinders. The curves cylinder A and cylinder B now extend parallel.

This therefore provides approximate equalization of the cylinders A and B in regard to the pre-chamber gas supplied. They therefore receive approximately the same amount of pre-chamber gas.

It is also to be seen that the pressures do not reach the pressure level of the pre-chamber gas supply, but, upon opening of the pre-chamber gas valves, are still in a rising trend, that is to say at that moment in time gas is still flowing out of the pre-chamber gas supply conduit 4 through the decentral aperture 5 into the volume 6 between the decentral aperture 5 and the pre-chamber gas valve 3.

Whether a decentral aperture 5 is designed in accordance with the invention can be very easily checked by measuring the pressure in the volume 6 between the decentral aperture 5 upstream of the pre-chamber gas valve 3 and the pressure in the pre-chamber gas supply conduit 4. Instrumentation with pressure sensors is effected in a way familiar to the man skilled in the art. If the pressure prevailing in the pre-chamber gas supply conduit 4 is not reached in the volume 6 between the combustion cycles (this mean the pressure which occurs at a maximum in the volume 6), then decentral apertures 5 are designed in accordance with the invention and the described equalization of the cylinders in respect of the amount of pre-chamber gas is achieved.

LIST OF REFERENCES USED 1 internal combustion engine
2 pre-chamber
3 pre-chamber gas valve
4 pre-chamber gas supply conduit
5 decentral aperture
6 volume between pre-chamber gas valve 3 and aperture 5
7 central aperture
8 pressure regulating valve
9 main gas supply conduit
10 induction manifold
Z cylinder
$\Delta p_i$ pressure drop, pressure variation

The invention claimed is:
1. An internal combustion engine comprising:
a plurality of cylinders;

a plurality of pre-chambers, wherein each cylinder of the plurality of cylinders is provided with a respective pre-chamber of the plurality of pre-chambers;

a pre-chamber gas supply conduit configured to supply a fuel gas;

a plurality of conduits, wherein each conduit of the plurality of conduits extends from the pre-chamber gas supply conduit to a respective pre-chamber of the plurality of pre-chambers;

a plurality of pre-chamber gas valves, wherein each conduit of the plurality of conduits has only one pre-chamber gas valve located therein between the pre-chamber gas supply conduit and the respective pre-chamber of the plurality of pre-chambers, wherein each of the plurality of pre-chamber gas valves comprises a non-return valve configured to open at a given pressure difference between a first pressure upstream of the non-return valve and a second pressure downstream of the non-return valve in fluid communication with the respective pre-chamber of the plurality of pre-chambers;

a plurality of apertures, wherein each conduit of the plurality of conduits has only one aperture located therein upstream of the only one pre-chamber gas valve, wherein each of the plurality of apertures is always open;

a central aperture arranged between the pre-chamber gas supply conduit and a pressure regulating valve associated with a gas supply; and wherein the only one aperture located in each conduit of the plurality of conduits has an opening sized with a through-flow coefficient limiting the first pressure within a volume between the only one pre-chamber gas valve and the only one aperture to a maximum pressure that remains below a supply pressure prevailing in the pre-chamber gas supply conduit during a combustion cycle, to meter an amount of the fuel gas being supplied without being skewed by the supply pressure and a starting pressure in the cylinder immediately before opening the only one pre-chamber gas valve.

2. The internal combustion engine as set forth in claim 1, wherein the through-flow coefficient of the only one aperture of at least two conduits of the plurality of conduits is different between the at least two conduits.

3. The internal combustion engine as set forth in claim 1, wherein the plurality of apertures limits the first pressures in the volumes of the plurality of conduits to substantially equalize amounts of the fuel gas being supplied by the plurality of pre-chambers to the plurality of cylinders.

4. The internal combustion engine as set forth in claim 1, wherein, when the plurality of cylinders have different pressures immediately before opening of the respective plurality of pre-chamber gas valves during the combustion cycle, the plurality of apertures limits the first pressures in the volumes to remain below the supply pressure during the combustion cycle to substantially equalize amounts of the fuel gas being supplied by the plurality of pre-chambers to the plurality of cylinders.

5. The internal combustion engine as set forth in claim 1, wherein, when the plurality of pre-chamber gas valves open and close to supply the amounts of the fuel gas during the combustion cycle, the plurality of apertures limits the first pressures in the volumes to remain below the supply pressure during the combustion cycle to substantially match maximum pressure variations in fuel pressures of the fuel gas supplied to the plurality of cylinders, wherein the maximum pressure variation in the fuel gas supplied in each of the plurality of cylinders corresponds to a maximum difference in the fuel pressure of the fuel gas between a starting value and an ending value.

6. The internal combustion engine as set forth in claim 5, wherein the starting and ending values of the fuel pressure are different in the plurality of cylinders.

7. The internal combustion engine as set forth in claim 1, wherein each of the plurality of apertures limits the first pressure to remain below 99 percent of the supply pressure of the fuel gas during the combustion cycle.

8. The internal combustion engine as set forth in claim 1, wherein each of the plurality of apertures limits the first pressure to remain below 95 percent of the supply pressure of the fuel gas during the combustion cycle.

9. The internal combustion engine as set forth in claim 1, wherein each of the plurality of apertures limits the first pressure to remain below 85 percent of the supply pressure of the fuel gas during the combustion cycle.

10. The internal combustion engine as set forth in claim 1, comprising a pressure sensor coupled to the volume between the only one pre-chamber gas valve and the only one aperture of each conduit of the plurality of conduits.

* * * * *